US011221788B2

(12) United States Patent
Jin et al.

(10) Patent No.: US 11,221,788 B2
(45) Date of Patent: Jan. 11, 2022

(54) DATA STORAGE METHOD AND DATA STORAGE ENGINE

(71) Applicants: Shichao Jin, Waterloo (CA); Cong Guo, Waterloo (CA); Quanzhao Chen, Xiangyang (CN); Yefeng Zhu, Hangzhou (CN); Wenfu Wang, Waterloo (CA)

(72) Inventors: Shichao Jin, Waterloo (CA); Cong Guo, Waterloo (CA); Quanzhao Chen, Xiangyang (CN); Yefeng Zhu, Hangzhou (CN); Wenfu Wang, Waterloo (CA)

( * ) Notice: Subject to any disclaimer, the term of this patent is extended or adjusted under 35 U.S.C. 154(b) by 167 days.

(21) Appl. No.: 16/669,539

(22) Filed: Oct. 31, 2019

(65) Prior Publication Data

US 2020/0341678 A1    Oct. 29, 2020

Related U.S. Application Data

(60) Provisional application No. 62/839,002, filed on Apr. 26, 2019.

(51) Int. Cl.
*G06F 3/06* (2006.01)
*G06F 12/02* (2006.01)
*G06F 16/22* (2019.01)
*G06F 16/23* (2019.01)

(52) U.S. Cl.
CPC .......... *G06F 3/0653* (2013.01); *G06F 3/0619* (2013.01); *G06F 3/0673* (2013.01); *G06F 12/0207* (2013.01); *G06F 12/0292* (2013.01); *G06F 16/2246* (2019.01); *G06F 16/23* (2019.01)

(58) Field of Classification Search
CPC .... G06F 16/20; G06F 12/0207; G06F 3/0619; G06F 3/0673; G06F 2212/463; G06F 16/2246; G06F 16/23; G06F 3/0653; G06F 12/0292
USPC ........................................................ 707/802
See application file for complete search history.

(56) References Cited

U.S. PATENT DOCUMENTS

| 7,774,391 B1* | 8/2010 | Le ......................... G06F 16/188 707/822 |
| 8,055,622 B1* | 11/2011 | Botes ..................... G06F 16/181 707/640 |
| 9,223,612 B1* | 12/2015 | Feldman ................ G06F 3/0623 |
| 2014/0279834 A1* | 9/2014 | Tsirogiannis ......... G06F 16/211 707/602 |

(Continued)

*Primary Examiner* — Kuen S Lu
(74) *Attorney, Agent, or Firm* — Bayramoglu Law Offices LLC (57) ABSTRACT

A data storage method includes the following steps: storing data to be stored into a mutable table, the mutable table being located in a RAM. If a storage content of the mutable table is greater than or equal to a preset storage content threshold, modifying the mutable table into an immutable table and stopping receiving storage of the data to be stored; if a storage content of a lowest level in a disk is greater than or equal to a storage content threshold of a present level, and next level higher in the disk is stored with columnar format, storing data of the lowest level to the next level in the columnar format; and if the lowest level is stored with row format, storing data in the immutable table to the lowest level in the row format.

16 Claims, 5 Drawing Sheets

(56) References Cited

U.S. PATENT DOCUMENTS

| | | | |
|---|---|---|---|
| 2014/0372353 A1* | 12/2014 | Yamamoto | G06F 16/9554 706/21 |
| 2016/0019254 A1* | 1/2016 | Vijayrao | G06F 16/235 707/737 |
| 2020/0334240 A1* | 10/2020 | Muralidhar | G06F 3/067 |

* cited by examiner

DATA STORAGE METHOD AND DATA STORAGE ENGINE

CROSS REFERENCE TO THE RELATED APPLICATIONS

This application is based upon and claims priority to the U.S. provisional application No. 62/839,002, filed on Apr. 26, 2019, the entire contents of which are incorporated herein by reference.

TECHNICAL FIELD

The embodiments of the disclosure relate to the field of database technologies, and more particularly, to a data storage method and a data storage engine.

BACKGROUND

As a means for storing data, database management systems support data storage, query, deletion, update and other operations. Data storage engines which serve as underlying components in the database management systems are used to store the data into various storage devices. A Log-Structured Merge (LSM) tree is widely used in the data storage engines, for example, a series of LSM-tree based data storage engines such as LevelDB, RocksDB, WiredTiger, etc. The RocksDB is taken as an example to illustrate a storage process of the LSM-tree, wherein the RocksDB has Random Access Memory (RAM) and disk storages, but the RAM of the RocksDB has more than two skiplists, one of which is a mutable table and the remaining are all immutable tables. New data is written into the mutable table. When the capacity of the mutable table reaches a certain threshold, a new mutable table is created and the original mutable table is used as an immutable table to write the data in the immutable table to the disk. The disk is divided into multiple levels, and each level corresponds to one or more Sorted String Table (SST) files for storing data, wherein the data in the RAM is written to a lower level, so that the data of the lower level is updated data in comparison to the data of the higher level, the SST files of the one or more lower levels can contain the same key-value, and the SST files of the remaining levels do not contain the same key-value.

In the process of researching the LSM-tree, it has been found by the inventors that the SST files stored in the LSM disk are all stored with row format, i.e., for multiple pieces of data, after storing all the attribute values contained in each piece of data, next piece of data is continuously stored. However, this storage method results in a lower efficiency of using range query when performing statistics on an attribute.

SUMMARY

The embodiments of the disclosure provide a data storage method and a data storage engine, which can solve the problem of lower efficiency of using range query caused by storing data into the disk in the row format.

According to a first aspect of the embodiments of the disclosure, there is provided a data storage method, including:

storing data to be stored into a mutable table, the mutable table being located in a RAM;

if a storage content of the mutable table is greater than or equal to a preset storage content threshold, modifying the mutable table into an immutable table and stopping receiving storage of the data to be stored;

if a storage content of a lowest level in a disk is greater than or equal to a storage content threshold of a present level, and next level higher in the disk is stored with columnar format, storing data of the lowest level to the next level in the columnar format; and if the lowest level is stored with row format, storing data in the immutable table to the lowest level in the row format.

According to a second aspect of the embodiments of the disclosure, there is provided a data storage engine, including:

a first storage module configured to store data to be stored into a mutable table, the mutable table being located in a RAM;

a mutable table modifying module configured to, if a storage content of the mutable table is greater than or equal to a preset storage content threshold, modify the mutable table into an immutable table and stop receiving storage of the data to be stored;

a second storage module configured to, if a storage content of a lowest level in a disk is greater than or equal to a storage content threshold of a present level, and next level higher in the disk is stored with columnar format, store data of the lowest level to the next level in the columnar format; and a third storage module configured to, if the lowest level is stored with row format, store data in the immutable table to the lowest level in the row format.

According to a third aspect of the embodiments of the disclosure, there is provided an electronic device, including:

a processor, a memory, and a computer program stored on the memory and operable on the processor, wherein the processor implements the forgoing data storage method when executing the program.

According to a fourth aspect of the embodiments of the disclosure, there is provided a readable storage medium that enables the electronic device to execute the forgoing data storage method when instructions in the storage medium are executed by a processor of the electronic device.

The embodiments of the disclosure provide the data storage method and the data storage engine. The method includes the following steps of: storing the data to be stored into a mutable table, the mutable table being located in the RAM; if the storage content of the mutable table is greater than or equal to the preset storage content threshold, modifying the mutable table into the immutable table and stopping receiving the storage of the data to be stored; if the storage content of the lowest level in the disk is greater than or equal to the storage content threshold of the present level, and next level higher in the disk is stored with columnar format, storing the data of the lowest level to the next level in the columnar format; and the lowest level is stored with row format if the lowest level is stored with row format, storing the data in the immutable table to the lowest level in the row format. In the disk, new data can be stored with row format and old data can be stored with columnar format, thus returning target data stored with columnar format during range query, which is helpful to improve query efficiency.

BRIEF DESCRIPTION OF THE DRAWINGS

In order to illustrate the technical solutions of the embodiments of the disclosure more clearly, the drawings used in the description of the embodiments of the disclosure will be briefly described below. Obviously, the drawings in the following description are merely some embodiments of the disclosure. Those of ordinary skills in the art can also obtain other drawings based on these drawings without going through any creative effort.

DETAILED DESCRIPTION OF THE EMBODIMENTS

The following clearly and completely describes the technical solutions in the embodiments of the disclosure with reference to the accompanying drawings in the embodiments of the disclosure. Apparently, the described embodiments are merely some but not all of the embodiments of the disclosure. Based on the embodiments of the present invention, all other embodiments obtained by those of ordinary skills in the art without going through any creative work shall fall within the protection scope of the embodiments of the disclosure.

First Embodiment

Figure 1:
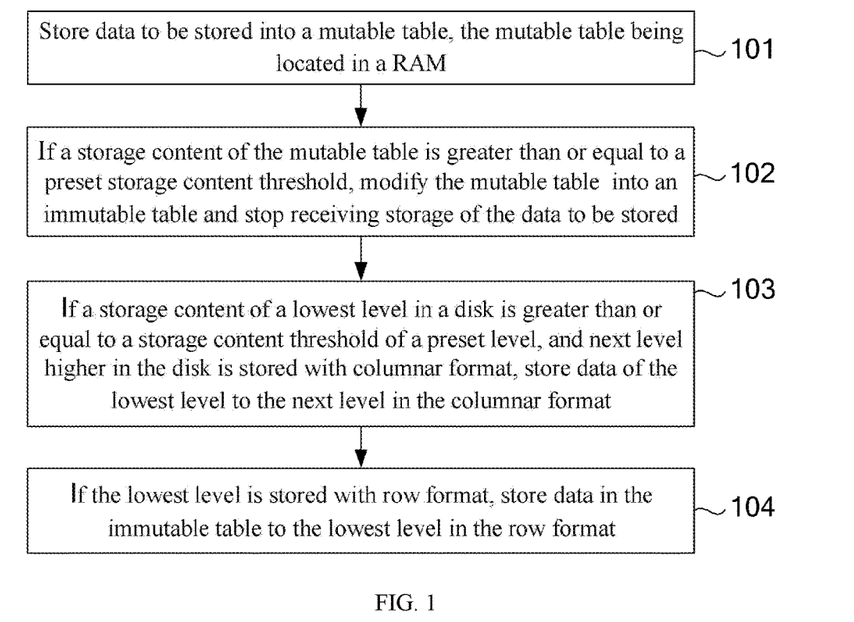
FIG. 1 illustrates a flow chart of steps of a data storage method according to one embodiment of the disclosure.

FIG. 1 illustrates a flow chart of steps of a data storage method according to one embodiment of the disclosure, which is specifically as follows.

The embodiment of the disclosure is applied to LSM-tree based data storage engines. The disclosure will be described with the implementation of RocksDB as an example, but the application of the disclosure is not limited to a series of LSM-tree based data engines such as RocksDB, LevelDB, WiredTiger, etc.

Figure 3A:
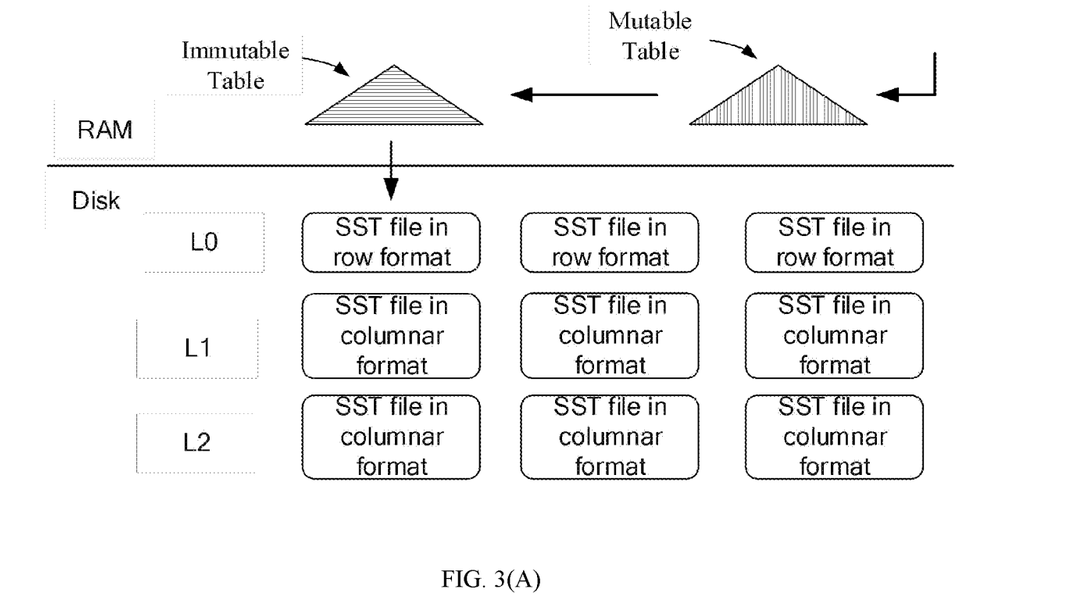
FIGS. 3A and 3B are schematic diagrams of multiple disk storage states according to the embodiments of the disclosure respectively.
Figure 3B:
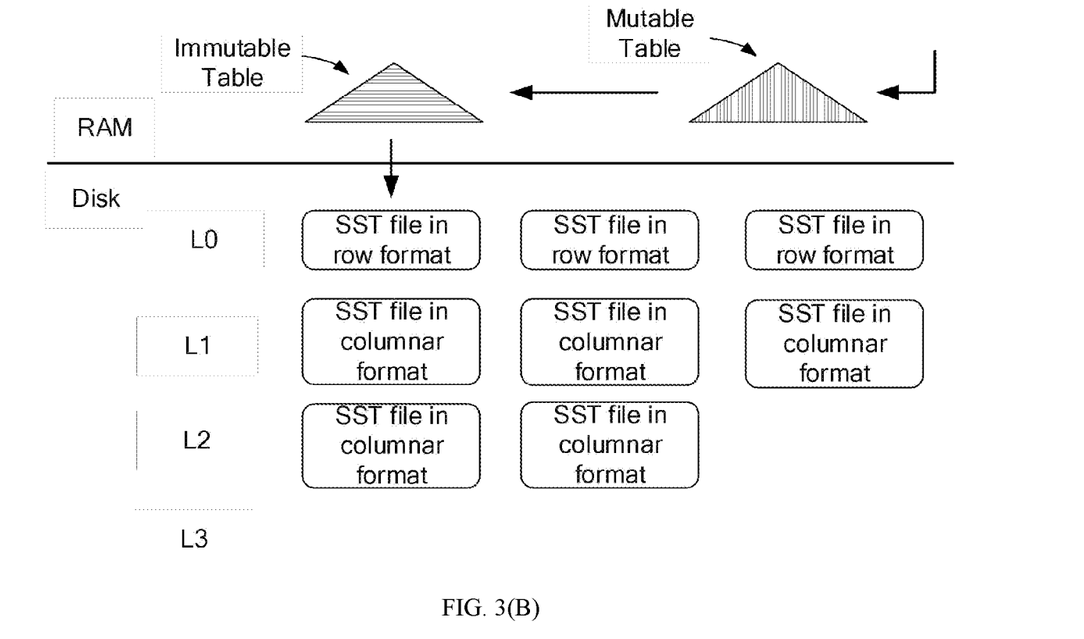

The data storage engine is used for managing data in a RAM and a disk, including operations of storage, deletion, update and the like. The RAM includes an immutable table and a mutable table. In the embodiment of the disclosure, the disk is divided into multiple levels, wherein some levels store data in a row format, and the other levels store data in a columnar format. In the following description, the part of levels in which data is stored with row format may be referred to as first class level, and the part of levels in which data is stored with columnar format may be referred to as second class levels. As shown in FIG. 3(A) or 3(B), a lowest level L0 is the first class level, and both a next level L1 and a level L2 after the next level L1 are the second class levels.

It can be understood that in practical application, a number of the first class level or the second class level can be 0, that is, when the number of the first class level is 0, all SST files in the disk are stored in columnar format; when the number of the second class level is 0, all SST files in the disk are stored in row format.

In step 101, data to be stored is stored into a mutable table, the mutable table being located in a RAM.

When new data to be stored arrives, the data is stored into the mutable table of the RAM firstly.

It can be understood that the mutable table is a data table receiving the data to be stored.

In step 102, if a storage content of the mutable table is greater than or equal to a preset storage content threshold, the mutable table is modified into an immutable table and receiving storage of the data to be stored is stopped.

The preset storage content threshold can be set according to actual application scenarios, which are not limited in the embodiment of the disclosure. For example, if a size of the mutable table needs to be set to 500 MB, when the storage content of the mutable table is greater than or equal to 500 MB, the mutable table no longer receives the data to be stored.

It can be understood that the immutable table is also in the RAM, and there may be multiple immutable tables, depending on the setting of parameters.

In the embodiment of the disclosure, if the storage content of the mutable table is greater than or equal to the preset storage content threshold, the mutable table stops receiving the storage of the data to be stored, and a new mutable table is generated to receive new data to be stored in the meanwhile. If the storage content of the mutable table is smaller than the preset storage content threshold, the storage of the data to be stored is continuously received.

In step 103, if a storage content of a lowest level in a disk is greater than or equal to a storage content threshold of a present level, and next level higher in the disk is stored with columnar format, data of the lowest level is stored to the next level in the columnar format.

The storage content threshold of the level can be expressed in the number of SST files or in the number of bytes. The storage content threshold of the level can be set according to actual application scenarios, which are not limited in the embodiment of the disclosure.

Specifically, all values of the same attribute can be stored continuously in the columnar format. For example, for data with four attributes of employee number, name, age and salary, there are following data of four employees: {id1, name1, age1, sal1}, {id2, name2, age2, sal2}, {id3, name3, age3, sal3}, {id4, name4, age4, sal4}, and the results of employing columnar storage can be as follows: firstly, the names are stored continuously, for example, name1, name2, name3 and name4 are stored continuously; then the ages are stored continuously, for example, age1, age2, age3, and age4 are stored continuously; and finally, the salaries are stored continuously, for example, sal1, sal2, sal3 and sal4 are stored continuously.

Figure 2A:
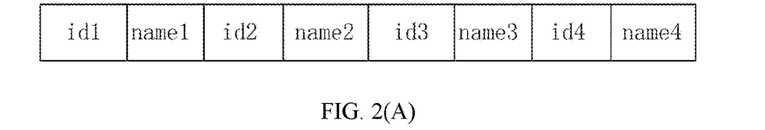
FIGS. 2A, 2B, 2C, 2D and 2E are schematic diagrams of multiple data storage methods according to the embodiments of the disclosure respectively.
Figure 2B:
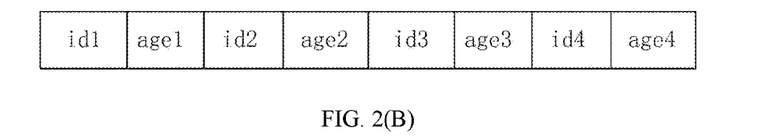
Figure 2C:
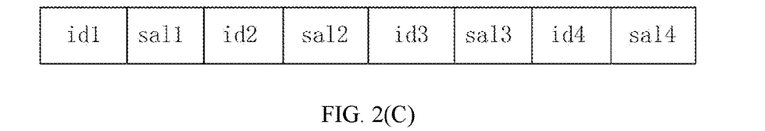

In the embodiment of the disclosure, each attribute can be stored as a separate SST file. For example, in a SST1 as shown in FIG. 2(A), id1 and name1, id2 and name2, id3 and name3 as well as id4 and name4 are continuously stored in the SST1 in sequence; in a SST2 as shown in FIG. 2(B), id1 and age1, id2 and age2, id3 and age3 as well as id4 and age4 are continuously stored in the SST2 in sequence; and in a SST3 as shown in FIG. 2(C), id1 and sal1, id2 and sal2, id3 and sal3 as well as id4 and sal4 are continuously stored in the SST3 in sequence.

Figure 2D:
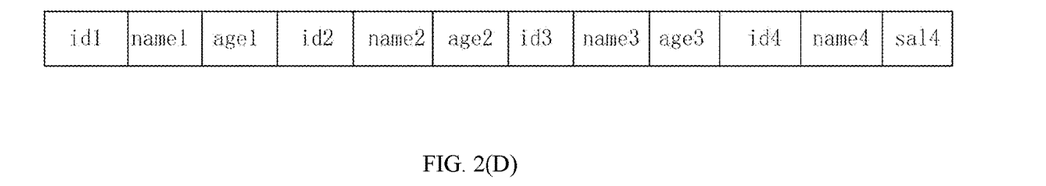

Of course, the values of two or more attributes can be stored into the same SST file. For example, in a SST4 as shown in FIG. 2(D), id1, name1 and age1, id2, name2 and age2, id3, name3 and age3 as well as id4, name4 and age4 can be continuously stored in the SST4 in sequence; as shown in FIG. 2(C), id1 and sal1, id2 and sal2, id3 and sal3 as well as id4 and sal4 are continuously stored in the SST3 in sequence.

It can be understood that in the extreme case, if all the attributes are stored in the same SST file, it is essentially row storage.

In the embodiment of the disclosure, the second class level usually stores historical data, and these historical data are usually used for data statistics, i.e. range query is performed on single or several attributes of the second class level, while the second class level stored in columnar format in the disclosure can help to improve the query efficiency of the range query.

In step 104, if the lowest level is stored with row format, data in the immutable table is stored to the lowest level in the row format.

Since the data in the immutable table is also stored with row format, the data in the immutable table does not need format conversion and is stored to the lowest level after serialization.

Figure 2E:
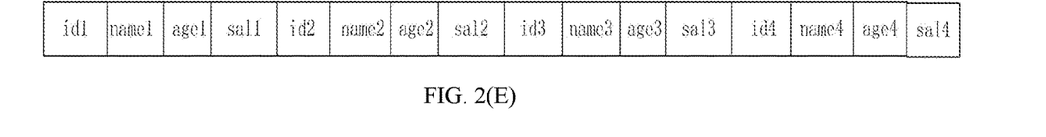

Specifically, all attributes for the same record can be stored continuously in the row format. For example, for data with four attributes of employee number, name, age and salary, there are following data of four employees: {id1, name1, age1, sai1}, {id2, name2, age2, sal2}, {id3, name3, age3, sal3}, {id4, name4, age4, sal4}, and the results of employing row storage can be as follows: as shown in FIG. 2(E), firstly, all the attributes for an employee record with an employee number of id1 are stored continuously, i.e., name1, age1 and sal1 are stored continuously; then, all attributes for an employee record with an employee number of id2 are stored continuously, i.e., name2, age2 and sal2 are stored continuously; and finally, all attributes for an employee record with an employee number of id3 are stored continuously, i.e., name3, age3 and sal3 are stored continuously.

In the embodiment of the disclosure, relative to the second class level, the first class level usually stores new data, and these new data are usually used for point query; therefore, the first class level stored in row format in the disclosure can help to improve the query efficiency of the point query.

In practical application, the division of the first class level and the second class level can be determined according to the statistical laws of the historical data or in-depth learning. For example, historical access records can be used to count access frequencies of point query and range query in various levels as well as single query costs of range query and point query (e.g., the time cost corresponding to each query). A product of the access frequency of the point query and the single query cost of the point query is taken as the comprehensive cost of the point query, and a product of the access frequency of the range query and the single query cost of range query is taken as the comprehensive cost of range query, thus setting the level with lower comprehensive cost of point query as the first class level and the level with lower comprehensive cost of range query as the second class level.

In addition, the storage format of each SST file in each level can be dynamically modified so that the SST files in row format and the SST files in columnar format exist simultaneously in the same level. For example, if the comprehensive cost of range query is low in the access record of one SST file in a row format within a historical time period, the SST file in the row format is converted into a SST file in the columnar format; if the comprehensive costs of point query and range query are equivalent, a SST file in the columnar format is additionally generated for the SST file in the row format, so that SST files in two formats exist for the same data, wherein the point query accesses the SST file in the row format, and the range query accesses the SST file in the columnar format.

For another example, if the comprehensive cost of point query is low in the access record of one SST file in a columnar format within a historical time period, the SST file in the columnar format is converted into a SST file in the row format; if the comprehensive costs of point query and range query are equivalent, a SST file in the row format is additionally generated for the SST file in the columnar format, so that SST files in two formats exist for the same data, wherein the point query accesses the SST file in the row format, and the range query accesses the SST file in the columnar format.

In conclusion, the embodiment of the disclosure provides the data storage method, including the following steps of: storing the data to be stored into a mutable table, the mutable table being located in the RAM; if the storage content of the mutable table is greater than or equal to the preset storage content threshold, modifying the mutable table into the immutable table and stopping receiving the storage of the data to be stored; if the storage content of the lowest level in the disk is greater than or equal to the storage content threshold of the present level, and next level higher in the disk is stored with columnar format, storing the data of the lowest level to the next level in the columnar format; and the lowest level is stored with row format if the lowest level is stored with row format, storing the data in the immutable table to the lowest level in the row format. In the disk, new data can be stored with row format and old data can be stored with columnar format, thus returning target data stored with columnar format during range query, which is helpful to improve query efficiency.

Second Embodiment

Figure 4:
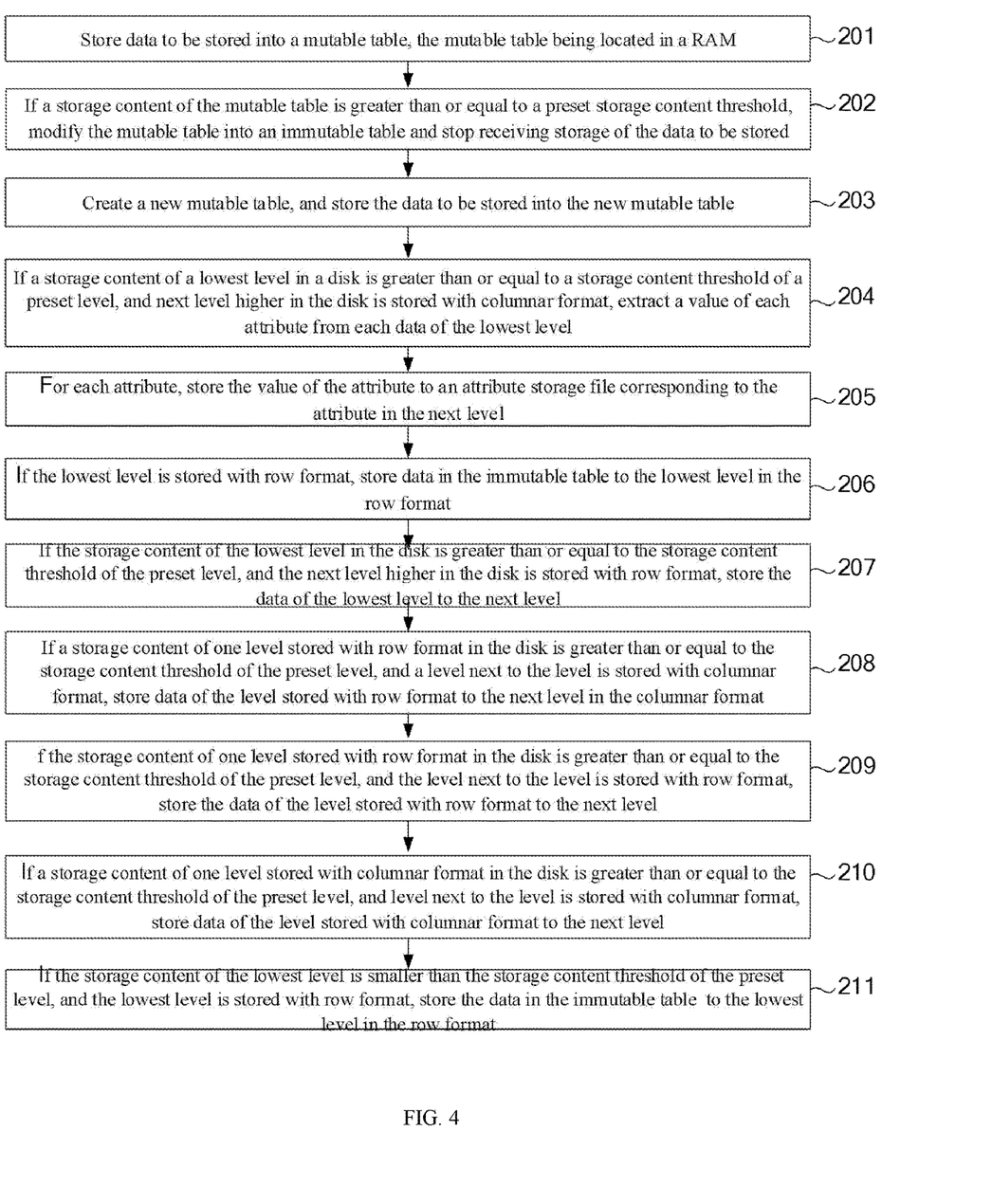
FIG. 4 illustrates a flow chart of steps of a data storage method according to another embodiment of the disclosure.

FIG. 4 illustrates a flow chart of steps of a data storage method according to another embodiment of the disclosure, which is specifically as follows.

In step 201, data to be stored is stored into a mutable table, the mutable table being located in a RAM.

For the step, reference may be made to the detailed description of the step 101, and details are not described herein again.

In step 202, if a storage content of the mutable table is greater than or equal to a preset storage content threshold, the mutable table is modified into an immutable table and receiving storage of the data to be stored is stopped.

For the step, reference may be made to the detailed description of the step 102, and details are not described herein again.

In step 203, a new mutable table is created, and the data to be stored is stored into the new mutable table.

Specifically, whether the storage content of the mutable table is greater than or equal to the preset storage content threshold can be judged after each storage is finished, and if the storage content of the mutable table is greater than or equal to the preset storage content threshold, a new mutable table is created, so that new data to be stored is directly stored into the new mutable table. Whether the storage content of the mutable table is greater than or equal to the preset storage content threshold can also be judged before each storage is finished, and if the storage content of the mutable table is greater than or equal to the preset storage content threshold, a new mutable table is created, so that new data to be stored this time is directly stored into the new mutable table.

In step 204, if a storage content of a lowest level in a disk is greater than or equal to a storage content threshold of a present level, and next level higher in the disk is stored with columnar format, a value of each attribute is extracted from each data of the lowest level.

Specifically, a data record is firstly extracted from the SST file stored in row format, and a value of each attribute in the data record is taken as a first value of the attribute, then a second data record is extracted, and a second value of each attribute is obtained in the same way, and so on, to obtain all the values of all the attributes of all the data records in the SST file stored in row format; and finally, all the values of each attribute are stored in the SST file stored in columnar format corresponding to the attribute, or the values of multiple attributes and corresponding key-values are taken as key-value pairs, and written into the same SST document in the order of the key-values.

Each data corresponds to one record stored in row format. For example, as shown in FIG. 2(E), name1, age1 and sal1 are data stored in row format; therefore, extracting the value of each attribute is: to read the data between two adjacent separators from the SST file stored in row format according to the separators, and then extract the value of each attribute.

It can be understood that if the storage content of the lowest level in the disk is greater than or equal to the storage content threshold of the present level, it means that the lowest level in the disk cannot receive the storage of the SST document, so that partial SST files of the lowest level need to be stored to the next level higher. If the next level higher is stored with columnar format at the moment, the row format needs to be converted into the columnar format.

In step 205, for each attribute, the value of the attribute is stored to an attribute storage file corresponding to the attribute in the next level.

It can be understood that the attribute storage file is a SST file stored with columnar format.

In step 206, if the lowest level is stored with row format, data in the immutable table is stored to the lowest level in the row format.

For the step, reference may be made to the detailed description of the step 104, and details are not described herein again.

In step 207, if the storage content of the lowest level in the disk is greater than or equal to the storage content threshold of the present level, and the next level higher in the disk is stored with row format, the data of the lowest level is stored to the next level.

In the embodiment of the disclosure, when the storage content of the lowest level reaches the storage content threshold of the preset level, the data of the lowest level needs to be stored to the next level, so that the data of the immutable table can be received by the lowest level. Since the lowest level is stored with row format, if the next level is still stored at the moment, the format conversion is not required, and the SST file in the row format is directly stored to the next level. Specifically, the SST file in the row format needs to be merged according to the key-values into the SST file with key-values overlapped therewith in the next level. If there is no SST file overlapping with the key-values of the SST file in the row format, the SST file in the row format is directly used as a new SST file and stored in the next level.

In step 208, if a storage content of one level stored with row format in the disk is greater than or equal to the storage content threshold of the present level, and a level next to the level is stored with columnar format, data of the level stored with row format is stored to the next level in the columnar format.

In the embodiment of the disclosure, after a new immutable table is generated, the immutable table needs to be stored to the lowest level. At this time, it is required to detect whether the lowest level reaches the storage content threshold of the preset level. In addition, it is also possible to periodically detect whether the storage content of each level reaches the storage content threshold of the preset level. When detecting that the storage content of one level reaches the storage content threshold of the present level, the data in the level stored with row format can be merged to the next level stored with columnar format; therefore, the storage format needs to be converted from the row format to the columnar format.

In step 209, if the storage content of one level stored with row format in the disk is greater than or equal to the storage content threshold of the present level, and the level next to the level is stored with row format, the data of the level stored with row format is stored to the next level.

When detecting that the storage content of one level reaches the storage content threshold of the present level, the data in the level stored with row format can be directly merged to the next level stored with row format, and format conversion is not required.

In step 210, if a storage content of one level stored with columnar format in the disk is greater than or equal to the storage content threshold of the present level, and level next to the level is stored with columnar format, data of the level stored with columnar format is stored to the next level.

When detecting that the storage content of one level reaches the storage content threshold of the present level, the data in the level stored with columnar format can be directly merged to the next level stored with columnar format, and format conversion is not required. As shown in FIG. 3(B), L1 and L2 are both in the columnar format, and L2 is the next level of L1. At this time, if the storage amount of L1 reaches the storage content threshold of the present level, the oldest SST in the level L1 is directly to the level L2 without performing format conversion. Specifically, the oldest SST file in the level L1 needs to be merged according to the key-values into the SST file with key-values overlapped therewith in the level L2. If there is no SST file overlapping with the key-values of the SST file, the oldest SST file in the level L1 is directly used as a new SST file and stored in L2.

It can be understood that in the detection process, there are the following limit cases: the storage content of each level reaches the storage content threshold of the present level. At this time, it is necessary to merge the data of each level to the next level, so that the lowest level can receive the immutable table. If the storage content threshold of the level is 3 SST files, the levels L0 and L1 of the three levels shown in FIG. 3(A) have both reached the storage content threshold, then the file of L1 needs to be merged into L2 and the file of L0 needs to be stored into L1. Specifically, the SST file in L1 can be stored into the SST file in the level L2 according to the key-values. For example, if the key-values of the SST file in L1 range from A to H, the SST file in L2 are divided into three SST files with key-values from A to G, H to M, and N to Z, such that the SST files with key-values ranging from A to H can be merged into two SST files with key-values ranging from A to G and H to M.

It should be noted that the storage content of the maximum level is unrestricted. As shown in FIG. 3(A), when the maximum number of levels is 3, the storage content of the maximum level L2 is unrestricted.

In the embodiment of the disclosure, there may also be a state that the storage content of some levels has reached the storage content threshold of the level; as shown in FIG. 3(B), if the maximum number of levels is 4, but the maximum level L3 does not store data, and the L2 level does not reach the storage content threshold of the level 3, at this time, the SST file in L2 may not need to be stored in L3, and only the SST file in L1 needs to be stored in L2, then the SST file in L0 is stored in L1, and finally the immutable table is stored in L0.

In step 211, if the storage content of the lowest level is smaller than the storage content threshold of the present level, and the lowest level is stored with row format, the data in the immutable table is stored to the lowest level in the row format.

It can be understood that if the storage content of the lowest level is smaller than the storage content threshold of the present level, it means that the lowest level can continuously store data, so that the data in the immutable table can be stored to the lowest level.

In the embodiment of the disclosure, the lowest level is set to be stored with row format, so that the immutable table needs to be stored to the lowest level in the row format. Of course, the lowest level may also be stored with columnar format. At this moment, the immutable table needs to be stored to the lowest level in the columnar format.

In conclusion, the embodiment of the disclosure provides the data storage method. On the basis of the first embodiment, the data storage method can also periodically detect the storage content in each level, store the data in each level to the next level, and finally store the data to the highest level with unlimited storage content, and can manage the level data in advance, so as to vacate the storage space in the low level and improve the storage speed of the immutable table, and can also perform format conversion or not perform format conversion according to the condition whether the formats among the levels are the same, thus realizing flexible inter-level data storage.

Third Embodiment

Figure 5:
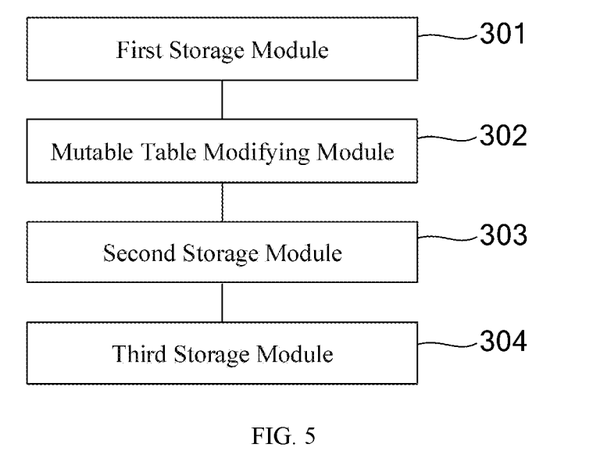
FIG. 5 illustrates a structural drawing of a data storage engine according to one embodiment of the disclosure.

FIG. 5 illustrates a structural drawing of a data storage engine according to one embodiment of the disclosure, wherein the data storage engine includes the followings.

A first storage module 301 is configured to store data to be stored into a mutable table, the mutable table being located in a RAM.

A mutable table modifying module 302 is configured to, if a storage content of the mutable table is greater than or equal to a preset storage content threshold, modify the mutable table into an immutable table and stop receiving storage of the data to be stored.

A second storage module 303 is configured to, if a storage content of a lowest level in a disk is greater than or equal to a storage content threshold of a present level, and next level higher in the disk is stored with columnar format, store data of the lowest level to the next level in the columnar format.

A third storage module 304 is configured to, if the lowest level is stored with row format, store data in the immutable table to the lowest level in the row format.

In conclusion, the embodiment of the disclosure provides the data storage engine, including: storing the data to be stored into a mutable table, the mutable table being located in the RAM; if the storage content of the mutable table is greater than or equal to the preset storage content threshold, modifying the mutable table into the immutable table and stopping receiving the storage of the data to be stored; if the storage content of the lowest level in the disk is greater than or equal to the storage content threshold of the present level, and next level higher in the disk is stored with columnar format, storing the data of the lowest level to the next level in the columnar format; and the lowest level is stored with row format if the lowest level is stored with row format, storing the data in the immutable table to the lowest level in the row format. In the disk, new data can be stored with row format and old data can be stored with columnar format, thus returning target data stored with columnar format during range query, which is helpful to improve query efficiency.

The third embodiment is an apparatus embodiment corresponding to the first embodiment. For detailed description, reference may be made to the first embodiment, and details are not described herein again.

Fourth Embodiment

Figure 6:
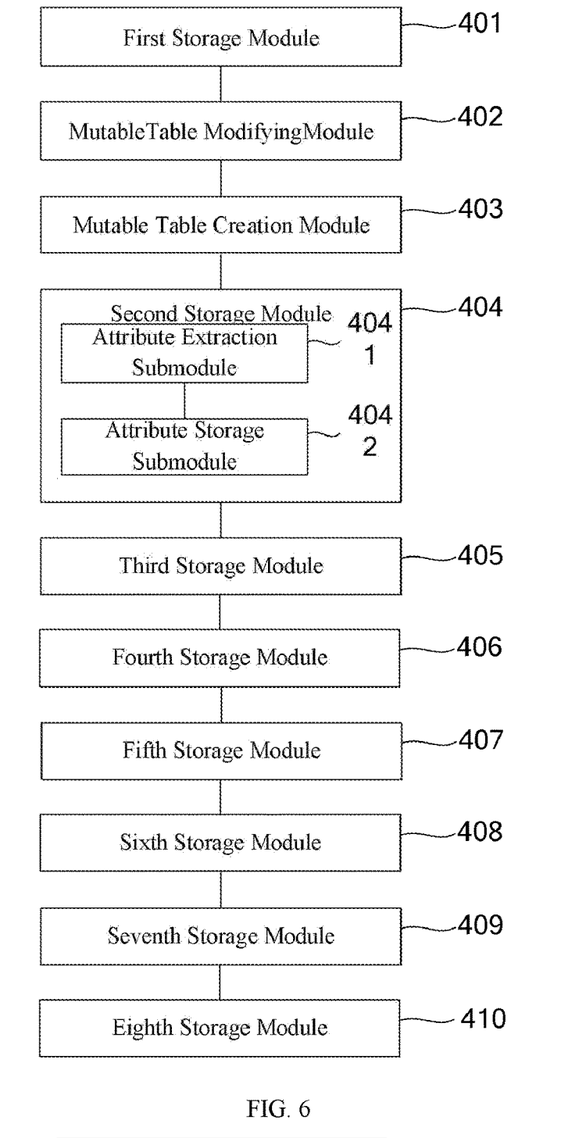
FIG. 6 illustrates a structural drawing of a data storage engine according to another embodiment of the disclosure.

FIG. 6 illustrates a structural drawing of a data storage engine according to another embodiment of the disclosure, wherein the data storage engine includes the followings.

A first storage module 401 is configured to store data to be stored into a mutable table, the mutable table being located in a RAM.

A mutable table modifying module 402 is configured to, if a storage content of the mutable table is greater than or equal to a preset storage content threshold, modify the mutable table into an immutable table and stop receiving storage of the data to be stored.

A mutable table creation module 403 is configured to create a new mutable table, and store the data to be stored into the new mutable table.

A second storage module 404 is configured to, if a storage content of a lowest level in a disk is greater than or equal to a storage content threshold of a present level, and next level higher in the disk is stored with columnar format, store data of the lowest level to the next level in the columnar format. Optionally, in the embodiment of the disclosure, the second storage module 404 includes the followings.

An attribute extraction submodule 4041 is configured to extract a value of each attribute from each data of the lowest level.

An attribute storage submodule 4042 is configured to, for each attribute, store the value of the attribute to an attribute storage file corresponding to the attribute in the next level.

A third storage module 405 is configured to, if the lowest level is stored with row format, store data in the immutable table to the lowest level in the row format.

A fourth storage module 406 is configured to, if the storage content of the lowest level in the disk is greater than or equal to the storage content threshold of the present level, and the next level higher in the disk is stored with row format, store the data of the lowest level to the next level.

A fifth storage module 407 is configured to, if a storage content of one level stored with row format in the disk is greater than or equal to the storage content threshold of the present level, and a level next to the level is stored with columnar format, storing data of the level stored with row format to the next level in the columnar format.

A sixth storage module 408 is configured to, if the storage content of one level stored with row format in the disk is greater than or equal to the storage content threshold of the present level, and the level next to the level is stored with row format, store the data of the level stored in row format to the next level.

A seventh storage module 409 is configured to, if a storage content of one level stored with columnar format in the disk is greater than or equal to the storage content threshold of the present level, and a level next to the level is stored with columnar format, store data of the level stored in columnar format to the next level.

An eighth storage module 410 is configured to, if the storage content of the lowest level is smaller than the storage content threshold of the present level, and the lowest level is stored with row format, store the data in the immutable table to the lowest level in the row format.

In conclusion, the embodiment of the disclosure provides another data storage engine. On the basis of the third embodiment, the data storage engine can also periodically detect the storage content in each level, store the data in each level to the next level, and finally store the data to the highest level with unlimited storage content, and can manage the level data in advance, so as to vacate the storage space in the low level and improve the storage speed of the immutable table, and can also perform format conversion or not perform format conversion according to the condition whether the formats among the levels are the same, thus realizing flexible inter-level data storage.

The fourth embodiment is an apparatus embodiment corresponding to the second embodiment. For detailed description, reference may be made to the second embodiment, and details are not described herein again.

Figure 7:
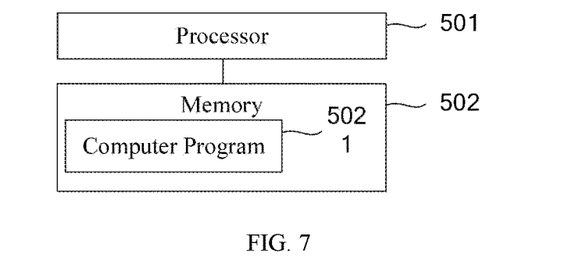
FIG. 7 illustrates a structural drawing of an electronic device according to one embodiment of the disclosure.

The embodiments of the disclosure further provide an electronic device, as shown in FIG. 7, including: a processor 501, a memory 502, and a computer program 5021 stored on the memory 502 and operable on the processor, wherein the processor 501 implements the data storage method of the foregoing embodiments when executing the program.

The embodiments of the disclosure further provide a readable storage medium that enables an electronic device to execute the data storage method of the foregoing embodiments when instructions in the storage medium are executed by a processor of the electronic device.

As for the apparatus embodiment, since it is basically similar to the method embodiments, the description of the apparatus embodiment is relatively simple. For relevant points, please refer to the partial description of the method embodiments.

The algorithms and displays provided herein are not inherently related to any particular computer, virtual system, or other devices. Various general-purpose systems may also be used with teachings based herein. From the above description, structures required to construct such a system are obvious. Furthermore, the embodiments of the disclosure are not directed to any particular programming language. It should be understood that the contents of the embodiments of the disclosure described herein can be implemented using various programming languages, and the above description of specific languages is for the purpose of disclosing the best mode of the embodiments of the disclosure.

Numerous specific details are given in the description provided herein. However, it can be understood that the embodiments of the disclosure may be practiced without these specific details. In some examples, well-known methods, structures and arts have not been shown in detail so as not to obscure the understanding of this description.

Similarly, it should be understood that in the above description on the exemplary embodiments of the disclosure, various features of the disclosure are sometimes grouped together into a single embodiment, drawing, or description thereof in order to streamline the disclosure and help understand various disclosed aspects. However, the disclosed methods should not be construed as reflecting the following intention that the embodiments of the disclosure sought to be protected require more features than those specifically recited in each claim. More specifically, as reflected in the following claims, the disclosed aspects lie in being less than all features of a single embodiment disclosed previously. Therefore, the claims following the specific embodiments are hereby expressly incorporated into the specific embodiments, wherein each claim itself serves as a separate embodiment of the disclosure.

Those skilled in the art can understand that the modules in the device in the embodiments can be adaptively changed and disposed in one or more devices different from the embodiment. The modules or units or components in the embodiments may be combined into one module or unit or component, and in addition, the modules or units or components may be divided into multiple sub-modules or sub-units or sub-components. In addition to the mutual exclusion of at least some of such features and/or processes or units, all of the features disclosed in the description (including the accompanying claims, abstract and drawings), and all the processes or units of any method or device disclosed in this manner may be combined in any combination. Unless explicitly stated otherwise, each feature disclosed in this description (including accompanying claims, abstract and drawings) may be replaced by alternative features that provide the same, equivalent or similar purpose.

The various member embodiments of the disclosure may be implemented in hardware, or in software modules running on one or more processors, or in a combination thereof. Those skilled in the art will appreciate that a microprocessor or a Digital Signal Processor (DSP) may be used in practice to implement some or all of the functions of some or all of the members in the data storage device according to the embodiments of the disclosure. The embodiments of the disclosure may also be implemented as a device or apparatus program for performing some or all of the methods described herein. Such a program for implementing the embodiments of the disclosure may be stored on a computer readable medium or may have the form of one or more signals. Such signals can be downloaded from Internet websites, or provided on carrier signals, or provided in any other form.

It should be noted that the above-mentioned embodiments illustrate rather than limit the embodiments of the disclosure, and those skilled in the art can design alternative embodiments without departing from the scope of the appended claims. In the claims, any reference signs placed between parentheses shall not be construed as limiting the claims. The word "including" does not exclude the presence of elements or steps not listed in the claims. The word "a" or "an" preceding an element does not exclude the presence of multiple such elements. The embodiments of the disclosure may be implemented by means of hardware comprising multiple different elements and by means of a suitably programmed computer. In the claim enumerating multiple apparatuses, several of these apparatuses can be specifically embodied by the same hardware item. The use of the words first, second, and third does not indicate any order. These words can be interpreted as names.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

Those described above are merely preferred embodiments of the disclosure, but are not intended to limit the embodiments of the disclosure. Any modifications, equivalent substitutions and improvements made without departing from the spirit and principle of the disclosure shall all fall within the protection scope of the embodiments of the disclosure.

The foregoing contents are merely detailed embodiments of the disclosure, but the protection scope of the embodiments of the disclosure is not limited thereto. Any person skilled in the art can easily think of changes or substitutions within the technical scope of the embodiments of the disclosure, and all the changes or substitutions should be covered by the protection scope of the embodiments of the disclosure. Therefore, the protection scope of the embodiments of the disclosure should be subjected to the protection scope of the claims.

What is claimed is:

1. A data storage method, comprising:
   storing data to be stored into a mutable table, the mutable table being located in a RAM;
   if a storage content of the mutable table is greater than or equal to a preset storage content threshold, modifying the mutable table into an immutable table and stopping receiving storage of the data to be stored;
   when a storage content of a lowest level in a disk is greater than or equal to a storage content threshold of a present level, and a next level higher in the disk is stored with a columnar format, storing data of the lowest level to the next level in the columnar format; and
   when the lowest level is stored with a row format, storing data in the immutable table to the lowest level in the row format;
   wherein the step of storing the data of the lowest level to the next level in the columnar format comprises:
   extracting a value of each attribute from each data of the lowest level; and
   for the each attribute, storing the value of the each attribute to an attribute storage file corresponding to an attribute in the next level.

2. The method according to claim 1, further comprising:
   when the storage content of the lowest level in the disk is greater than or equal to the storage content threshold of the present level, and the next level higher in the disk is stored with the row format, storing the data of the lowest level to the next level.

3. The method according to claim 2, further comprising:
   when a storage content of one level stored with the row format in the disk is greater than or equal to the storage content threshold of the present level, and a level next to the one level is stored with the columnar format, storing data of the one level stored with the row format to the next level in the columnar format;
   when the storage content of the one level stored with the row format in the disk is greater than or equal to the storage content threshold of the present level, and the level next to the one level is stored with the row format, storing the data of the one level stored with the row format to the next level; and
   when the storage content of the one level stored with the columnar format in the disk is greater than or equal to the storage content threshold of the present level, and a level next to the level is stored with the columnar format, storing the data of the one level stored with the columnar format to the next level.

4. The method according to claim 3, wherein the data is stored in each level in SST files, and the method further comprises:
   dynamically modifying a storage format of the each SST file in the each level.

5. The method according to claim 2, wherein the data is stored in each level in SST files, and the method further comprises:
   dynamically modifying a storage format of the each SST file in the each level.

6. The method according to claim 1, further comprising:
   when the storage content of the lowest level is smaller than the storage content threshold of the present level, and the lowest level is stored with the row format, storing the data in the immutable table to the lowest level in the row format.

7. The method according to claim 6, wherein the data is stored in each level in SST files, and the method further comprises:
   dynamically modifying a storage format of the each SST file in the each level.

8. The method according to claim 1, wherein after the step of modifying the mutable table into the immutable table, the method further comprises:
   creating a new mutable table, and storing the data to be stored into the new mutable table.

9. The method according to claim 8, wherein the data is stored in each level in SST files, and the method further comprises:
   dynamically modifying a storage format of the each SST file in the each level.

10. The method according to claim 1, wherein the data is stored in each level in SST files, and the method further comprises:
    dynamically modifying a storage format of the each SST file in the each level.

11. The method according to claim 1, wherein the data is stored in each level in SST files, and the method further comprises:
    dynamically modifying a storage format of the each SST file in the each level.

12. An electronic device, comprising:
    a processor,
    a memory, and
    a computer program stored on the memory and operable on the processor,
    wherein the processor executes the program to perform operations comprising:
    storing data to be stored into a mutable table, the mutable table being located in a RAM;
    if a storage content of the mutable table is greater than or equal to a preset storage content threshold, modifying the mutable table into an immutable table and stopping receiving storage of the data to be stored;
    when a storage content of a lowest level in a disk is greater than or equal to a storage content threshold of a present level, and a next level higher in the disk is stored with a columnar format, storing data of the lowest level to the next level in the columnar format; and
    when the lowest level is stored with a row format, storing data in the immutable table to the lowest level in the row format;
    wherein the step of storing the data of the lowest level to the next level in the columnar format comprises:
    extracting a value of each attribute from each data of the lowest level; and
    for the each attribute, storing the value of the each attribute to an attribute storage file corresponding to an attribute in the next level.

13. The electronic device according to claim 12, further comprising:
    when the storage content of the lowest level in the disk is greater than or equal to the storage content threshold of the present level, and the next level higher in the disk is stored with the row format, storing the data of the lowest level to the next level.

14. The electronic device according to claim 13, further comprising:
   when a storage content of one level stored with the row format in the disk is greater than or equal to the storage content threshold of the present level, and a level next to the one level is stored with the columnar format, storing data of the one level stored with the row format to the next level in the columnar format;
   when the storage content of the one level stored with the row format in the disk is greater than or equal to the storage content threshold of the present level, and the level next to the one level is stored with the row format, storing the data of the one level stored with the row format to the next level; and
   when the storage content of the one level stored with the columnar format in the disk is greater than or equal to the storage content threshold of the present level, and a level next to the level is stored with the columnar format, storing the data of the one level stored with the columnar format to the next level.

15. The electronic device according to claim 12, further comprising:
   when the storage content of the lowest level is smaller than the storage content threshold of the present level, and the lowest level is stored with the row format, storing the data in the immutable table to the lowest level in the row format.

16. The electronic device according to claim 12, wherein after the step of modifying the mutable table into the immutable table, the method further comprises:
   creating a new mutable table, and storing the data to be stored into the new mutable table.

* * * * *